June 5, 1923.
F. P. H. BEADLE
1,457,955
VARIABLE CAMBER AEROFOIL FOR AIRCRAFT
Filed Dec. 8, 1922   2 Sheets-Sheet 1
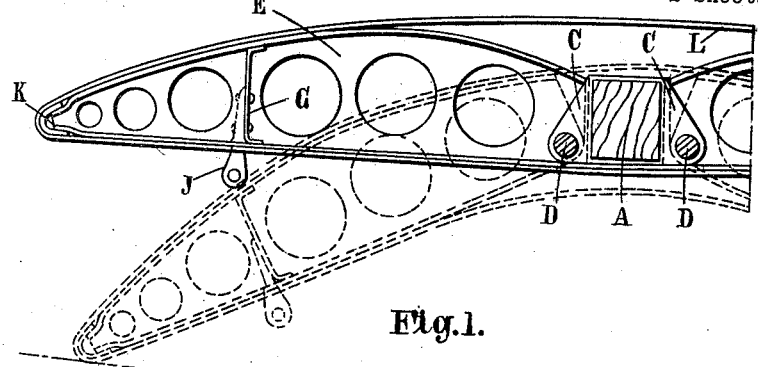
Fig.1.
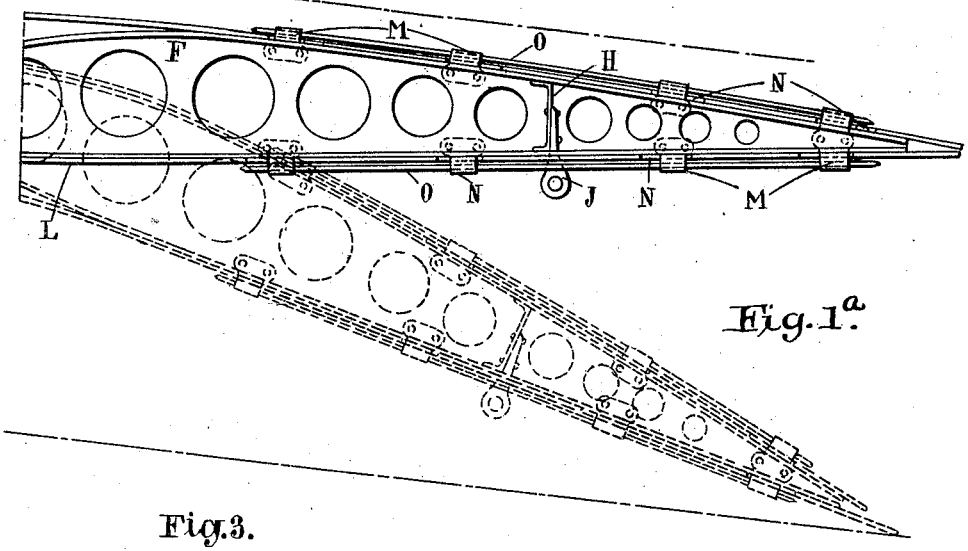
Fig.1.ᵃ
Fig.3.
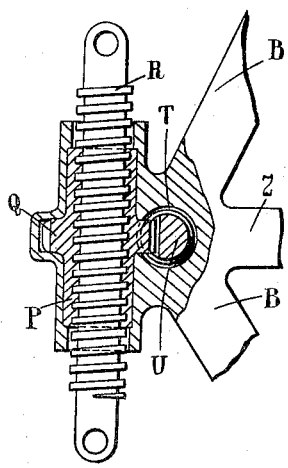
Fig.5.
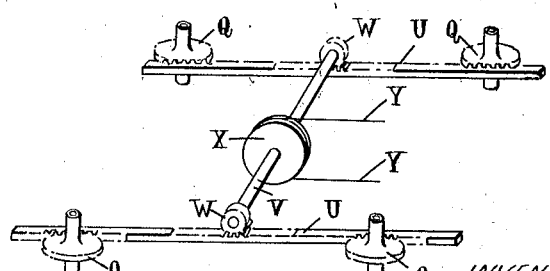
INVENTOR
Francis Percy Hyde Beadle
By
Attorney June 5, 1923.
F. P. H. BEADLE
1,457,955
VARIABLE CAMBER AEROFOIL FOR AIRCRAFT
Filed Dec. 8, 1922 2 Sheets-Sheet 2
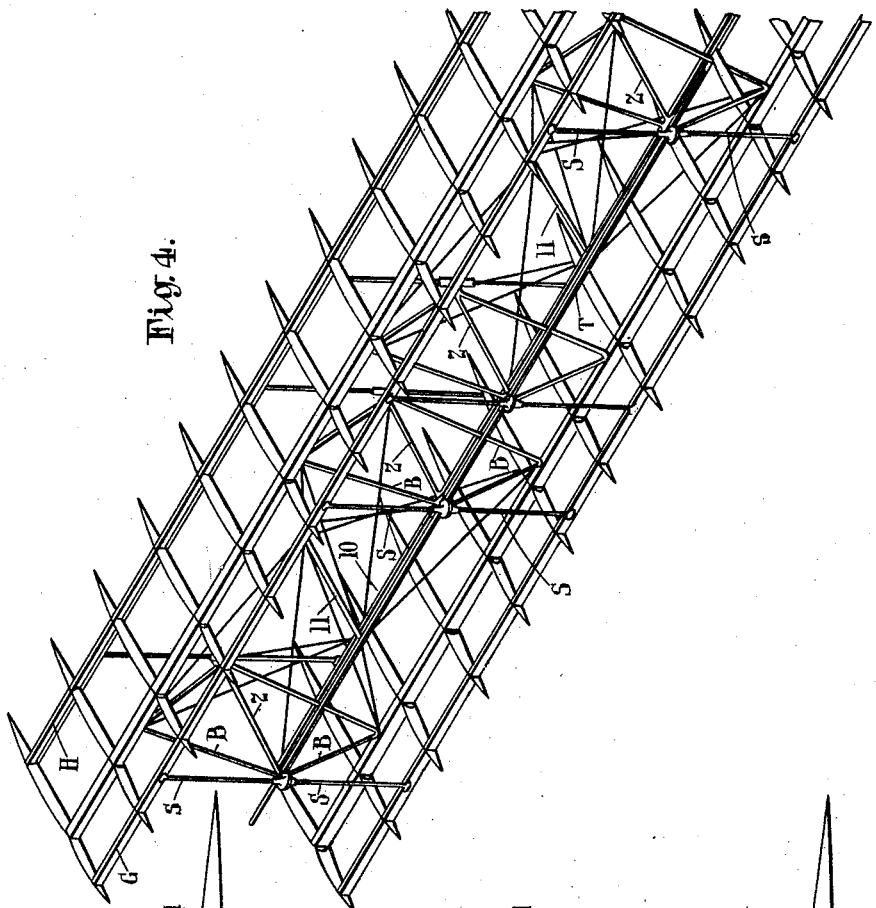
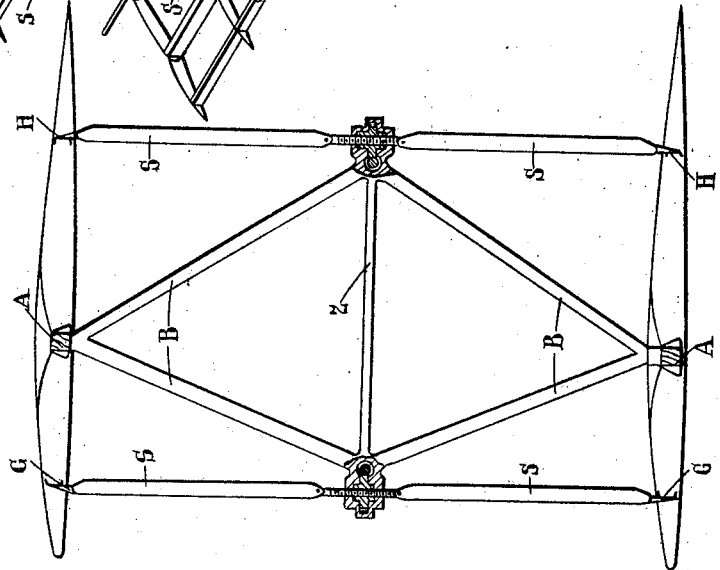
INVENTOR
Francis Percy Hyde Beadle Patented June 5, 1923.

1,457,955

UNITED STATES PATENT OFFICE.

FRANCIS PERCY HYDE BEADLE, OF EAST BOLDRE, ENGLAND.

VARIABLE-CAMBER AEROFOIL FOR AIRCRAFT.

Application filed December 8, 1922. Serial No. 605,619.

*To all whom it may concern:*

Be it known that I, FRANCIS PERCY HYDE BEADLE, subject of the King of Great Britain, residing at East Boldre, Hampshire, England, have invented certain new and useful Improvements in and Relating to Variable-Camber Aerofoils for Aircraft, of which the following is a specification.

This invention relates to variable camber aerofoils for wings for aircraft and to means controlled by the pilot for adjusting the camber to give greater lifting effort or greater speed as may be required at any particular moment.

It has been heretofore proposed to construct a variable camber aerofoil by mounting forward and rearward members extending in a fore and aft direction on separate axes transverse to the line of flight, and connecting the adjacent ends of these members together by a bar intermediate of said axes so that by raising and lowering the inner end of said bar the camber of the wing can be varied. In this arrangement the camber is not made variable throughout its whole length, but only for a portion of its length, and moreover the variability is not uniform.

According to my invention the whole of the aerofoil is made with a variable camber which is uniform throughout the whole length of the aerofoil. For this purpose I construct the aerofoil or wing with a median main longitudinal spar or girder, and a number of frame members hinged thereto or pivoted thereon and extending fore and aft, the free edges of said members being adjustably supported by mechanisms which are under the control of the pilot and which can be actuated to turn the frame members about their pivots and thus vary the camber of the wing. The covering of the wing extends from the forward to the rear edge of the wing, and is rigidly attached to the forwardly extending frame members, but has a sliding connection with the rearwardly extending frame members, in order that the camber may be varied without causing buckling of the covering.

My invention is illustrated in the accompanying drawings, of which:—

Figures 1 and 1ª are sections fore and aft of an aerofoil constructed according to my invention, and showing in broken lines a flexed position of the aerofoil.

Figure 2 is a fore and aft section of a biplane showing the means for supporting and flexing the aerofoils.

Figure 3 is a section on an enlarged scale of a part of the operating gear for flexing the aerofoils.

Figure 4 is a perspective view of the frame members of a biplane, and

Figure 5 is a diagrammatic view of another part of the flexing gear actuated by the pilot.

Like letters denote corresponding parts in the several figures.

The main spar or girder A of each aerofoil is rigidly attached or braced to the fuselage or body of the machine by means of strut members B, B and is furnished with a series of bearings or hinges C, C to which are attached by means of pins D, D the forward frame members E, on one side, and the rearward frame members F, on the opposite side. The forward and rearward wing frame members are respectively connected to secondary spars or girders G and H to which are rigidly attached lugs J, J at top or bottom as desired, or other suitable means for attaching the operating gear necessary to flex or bend the wing section formed by the aforesaid frame members, in conjunction with the top and bottom covering material.

A nose piece K running the whole length of the wing, serves to connect the free edges of the complete series of forward frame members, to which is attached by a suitable means, such as screws, nails, bolts and nuts, or the like, the covering material L of the wing. This covering material, is made of plywood, sheet metal or other suitable material, and is securely fixed to the forward frame members as stated, but is in sliding contact with the rearward frame members. For this purpose the rearward frame members, where desired, are furnished with lugs M which pass through slots N in the covering material and which are holed to receive retaining wires O. These wires form a means of holding the covering material on to the rearward frame members and so ensure the desired wing shape being maintained and at the same time allowing the covering material to slide when the wing is being flexed.

As applied to a biplane the top and bottom planes are suitably attached to the top and bottom respectively of diamond shaped interplane struts B situated with respect to the planes in line with the points where the flexing gear operates. These struts are compounded with the fuselage of the machine. At each of the side corners of each diamond shaped strut, a bearing is provided to house a hollow rotatable shaft P which is provided with internal screw threads and carries a gear wheel Q rigidly attached thereto. This hollow shaft is prevented by its housing from moving endwise. Passing through each hollow screwed shaft P is a screw threaded rod R engaging therewith, the ends of said rod being connected through suitable connecting rods S to the frame members G and H respectively of the wings. The rod R may have a key way and feather connection with the housing that carries the shaft P in order to resist any tendency it may have to turn when the shaft P rotates.

The corresponding side points of the whole series of diamond shaped struts are connected by means of hollow tubular struts T within which are situated reciprocatory rods U provided with toothed portions engaging with the gear wheels Q. These reciprocatory rods are under the control of the pilot and can be moved as desired to rotate the gear wheels Q.

A suitable operating gear is indicated in Figure 5 in which Q are the gear wheels to be driven by means of the reciprocatory rods U. V is a cross shaft carrying pinions W in gear with the teeth of the rods U, and a pulley X which is actuated by the pilot through a cord or chain Y. Preferably this cord or chain is operated by means of a hand wheel. On turning this hand wheel the pilot is able to impart motion to the reciprocatory rods and so put in motion the complete gear for flexing the wings.

The tubular struts T which carry the reciprocatory rods have another important function, viz:—in conjunction with cross bars Z in the diamond shaped struts and cross bracing wires 10 they form a girder, ending with the body or fuselage, to withstand and transmit thereto the resistance created by the wings when in flight. Extra cross struts 11 are interposed between those of the diamond shaped struts to act as spreaders for the main lift and landing wires which are run to those points from the top and bottom of each diamond shaped strut. These extra cross struts also assist in withstanding the drift load.

What I claim is:—

1. In a variable camber aerofoil mechanism for aircraft, a strut comprising a polygonal frame, a longitudinal spar fixedly supported by said frame at one of its angles, a series of fore and aft wing frame sections hingedly carried by said spar, and means for supporting the free edges of said wing frame sections and turning them about their hinges, said means being carried by said strut frame at other of its angles.

2. A variable camber aerofoil for aircraft, comprising a main median fixed longitudinal spar, a series of fore and aft wing frame sections hinged thereto, a flexible covering extending from the forward to the rear edge of the wing for enclosing said fore and aft wing frame sections, said covering being fixed to the forward frame sections, and being slotted adjacent the rearward wing frame sections, means on said rearward wing frame sections projecting through the slots of said covering, and retaining means for said covering engaging said projecting means above said covering.

3. In a biplane, a series of interplane diamond-shaped struts arranged in parallel planes, longitudinal spars fixedly supported by said struts at one pair of the opposite angles of each, fore and aft wing frame sections hingedly secured to said spars, common means carried by the other pairs of opposite angles of said strut for supporting the free edges of the upper and lower fore and aft wing frame sections, and for turning them about their hinges, and actuating means for said supporting and turning means extending through said struts at said last mentioned pairs of angles, lying substantially parallel to said spars.

In testimony whereof I have hereunto set my hand.

FRANCIS PERCY HYDE BEADLE.